US011289991B2

(12) United States Patent
Matsumoto

(10) Patent No.: US 11,289,991 B2
(45) Date of Patent: Mar. 29, 2022

(54) ELECTRODYNAMIC ACTUATOR AND ELECTRODYNAMIC EXCITATION DEVICE WITH MOVABLE PART SUPPORT MECHANISM AND FIXED PART SUPPORT MECHANISM

(71) Applicant: KOKUSAI KEISOKUKI KABUSHIKI KAISHA, Tokyo (JP)

(72) Inventor: Sigeru Matsumoto, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/516,590

(22) Filed: Jul. 19, 2019

(65) Prior Publication Data
US 2019/0341837 A1 Nov. 7, 2019

Related U.S. Application Data

(63) Continuation of application No. 14/060,969, filed on Oct. 23, 2013, now abandoned, which is a
(Continued)

(30) Foreign Application Priority Data

Apr. 26, 2011 (JP) .............................. JP2011-098775
Oct. 31, 2011 (JP) .............................. JP2011-238849

(51) Int. Cl.
*H02K 41/02* (2006.01)
*G01M 7/02* (2006.01)
(Continued)

(52) U.S. Cl.
CPC ............. *H02K 41/02* (2013.01); *B06B 1/045* (2013.01); *G01M 7/027* (2013.01); *G01M 7/06* (2013.01); *H02K 33/12* (2013.01)

(58) Field of Classification Search
CPC ...... H02K 41/02; H02K 41/025; H02K 41/03; H02K 41/031; H02K 33/12; G01M 7/02;
(Continued)

(56) References Cited

U.S. PATENT DOCUMENTS

| 4,748,851 A | 6/1988 | Yoneda |
| 5,145,262 A * | 9/1992 | Morita ..................... F16C 29/04 384/101 |

(Continued)

FOREIGN PATENT DOCUMENTS

| CN | 101542260 A | 9/2009 |
| GB | 2184848 A | 7/1987 |

(Continued)

OTHER PUBLICATIONS

WO2009011433A9 English Translation.*
(Continued)

*Primary Examiner* — Maged M Almawri
(74) *Attorney, Agent, or Firm* — McCarter & English, LLP

(57) ABSTRACT

A linear actuator, comprising: a base; a fixed part support mechanism attached to the base; a fixed part elastically supported by the fixed part support mechanism; and a movable part driven to reciprocate in a predetermined drive direction with respect to the fixed part, wherein the fixed part support mechanism comprises: a movable block attached to the fixed part; a linear guide that couples the movable block with the base to be slidable in the predetermined drive direction; and an elastic member that is disposed between the base and the movable block and prevents transmission of a high frequency component of vibration in the predetermined drive direction.

16 Claims, 11 Drawing Sheets

Related U.S. Application Data continuation-in-part of application No. PCT/JP2012/060581, filed on Apr. 19, 2012.

(51) Int. Cl.
*G01M 7/06* (2006.01)
*H02K 33/12* (2006.01)
*B06B 1/04* (2006.01)

(58) Field of Classification Search
CPC .......... G01M 7/04; G01M 7/06; G01M 7/027; B06B 1/045
USPC .................. 310/12.16, 12.05; 73/662, 663
See application file for complete search history.

(56) References Cited

U.S. PATENT DOCUMENTS

| | | | | |
|---|---|---|---|---|
| 5,351,545 | A * | 10/1994 | Lucas | B06B 1/045 73/663 |
| 7,051,593 | B2 * | 5/2006 | Fletcher | G01M 7/027 73/665 |
| 7,069,787 | B2 * | 7/2006 | Crowson, II | G01M 7/04 297/217.3 |
| 7,187,143 | B2 * | 3/2007 | Okada | H01L 21/67709 310/10 |
| 2004/0194565 | A1 * | 10/2004 | Okada | H01L 21/67709 74/111 |
| 2014/0049122 | A1 * | 2/2014 | Matsumoto | G01M 7/027 310/12.16 |
| 2016/0076966 | A1 * | 3/2016 | Khulief | G01M 7/06 73/663 |
| 2016/0094116 | A1 * | 3/2016 | Eklund | A61M 16/20 318/135 |
| 2018/0321111 | A1 * | 11/2018 | Matsumoto | B06B 1/045 |

FOREIGN PATENT DOCUMENTS

| | | | |
|---|---|---|---|
| GN | 101414778 B | 12/2010 | |
| JP | S50-147052 U | 12/1975 | |
| JP | S54-143154 U | 10/1979 | |
| JP | S58-115340 A | 7/1983 | |
| JP | H04-017510 U | 2/1992 | |
| JP | H05-500472 A | 2/1993 | |
| JP | H08-136392 A | 5/1996 | |
| JP | H10-239149 A | 9/1998 | |
| JP | 3616058 B2 | 2/2005 | |
| JP | WO-2009011433 A9 * | 10/2009 | ............. G01M 7/02 |
| JP | WO-2009130818 A1 * | 10/2009 | ............. G01M 7/06 |
| KR | 10-2009-0130882 A | 12/2009 | |
| TW | 200944773 A | 11/2009 | |
| TW | 200944774 A | 11/2009 | |
| WO | 91/04801 A1 | 4/1991 | |
| WO | 2009/011433 A1 | 1/2009 | |
| WO | 2009/130818 A1 | 10/2009 | |
| WO | 2009/130953 A1 | 10/2009 | |
| WO | 2009/144989 A1 | 12/2009 | |

OTHER PUBLICATIONS

WO2009130818A1 English Translation.*
International Search Report dated Jul. 17, 2012, in International Application No. PCT/JP2012/060581 (5 pages, with English translation).
International Preliminary Report on Patentability dated Jun. 3, 2013, in International Application No. PCT/JP2012/060581 (15 pages, with English translation).
Extended European Search Report issued in European Application No. 12776949.5 dated Feb. 17, 2016 (11 pages).
Office Action issued in Japanese Application No. 2015-211790 dated Aug. 24, 2016 (7 pages, with English translation).
Office Action issued in Chinese Application No. 201610161778.X dated Aug. 25, 2017 (18 pages, with English translation).
Office Action issued in Chinese Application No. 201610161777.5 dated Nov. 1, 2017 (16 pages, with English translation).
Office Action issued in European Application No. 12776949.5 dated Jan. 30, 2018 (5 pages).
Office Action issued in Japanese Application No. 2017-080291 dated Feb. 26, 2018 (12 pages, with English translation).
Office Action issued in Chinese Application No. 201610161777.5 dated May 3, 2018 (14 pages, with English translation).
Office Action issued in Chinese Application No. 201610161778.X dated May 4, 2018 (20 pages, with English translation).
Office Action issued in Korean Application No. 10-2013-7031082 dated Jul. 6, 2018 (9 pages, with English translation).
Office Action issued in Chinese Application No. 201610161777.5 dated Oct. 24, 2018 (14 pages, with English translation).
Office Action dated Jul. 13, 2016, issued in connection with U.S. Appl. No. 14/060,969 (17 pages).
Office Action dated Jul. 27, 2017, issued in connection with U.S. Appl. No. 14/060,969 (22 pages).
Office Action dated Apr. 17, 2018, issued in connection with U.S. Appl. No. 14/060,969 (25 pages).
Office Action dated Nov. 7, 2018, issued in connection with U.S. Appl. No. 14/060,969 (20 pages).
Office Action dated May 14, 2019, issued in connection with U.S. Appl. No. 14/060,969 (20 pages).
Extended European Search Report dated Feb. 3, 2020, issued in European Application No. 19207390.6 (11 pages).

* cited by examiner

ELECTRODYNAMIC ACTUATOR AND ELECTRODYNAMIC EXCITATION DEVICE WITH MOVABLE PART SUPPORT MECHANISM AND FIXED PART SUPPORT MECHANISM

RELATED APPLICATIONS

The present application is a Continuation of U.S. application Ser. No. 14/060,969 filed on Oct. 23, 2013, which is a Continuation-in-Part of International Application No. PCT/JP2012/060581 filed Apr. 19, 2012, which claims priority from Japanese Patent Applications Nos. 2011-098775 filed Apr. 26, 2011 and 2011-238849 filed Oct. 31, 2011. The entire disclosure of the prior applications is hereby incorporated by reference herein.

TECHNICAL FIELD

The present invention relates to an electrodynamic actuator and an electrodynamic excitation device employing the electrodynamic actuator.

BACKGROUND

An electrodynamic excitation device employing a so-called voice coil motor as a driving device is known. In PCT International Publication No. WO2009/130953 (hereafter, referred to as patent document 1), a triaxial excitation device 1 in which three electrodynamic actuators 200, 300 and 400 whose drive axes are oriented to perpendicularly intersect with each other are coupled to a vibration table 100 is disclosed. In the excitation device 1 described in the patent document 1, a drive shaft of each electrodynamic actuator is coupled to the vibration table 100 via a biaxial slider (joint parts 240, 340 and 440) which is slidable in two axes directions which are perpendicular to the drive axis. The biaxial slider 240 (340, 440) is configured by coupling a pair of linear guides disposed such that movable axes thereof are perpendicular to each other, via an intermediate stage 245 (345, 445). With this configuration, one electrodynamic actuator is able to drive the excitation table 100 without being strongly affected by driving of the excitation table 100 by the other electrodynamic actuators.

SUMMARY

However, in the electrodynamic actuator used in the excitation device 1 of the patent document 1, a movable part 230 is supported by a fixed part 222 only at a tip portion of a slender bar 234 protruding in a drive direction from one end off a body part 232. Therefore, the body part 232 of the movable part 230 is not supported at a high degree of rigidity in regard to the direction perpendicular to the drive direction, and therefore is easily vibrated in non-drive directions. For this reason, there is a case where crosstalk is caused between the drive axes due to vibrations of the movable part 230 in the non-drive directions and thereby the accuracy of excitation deteriorates.

The present invention is advantageous in that it provides an electrodynamic actuator whose movable part is hard to vibrate in the non-derive directions, and an electrodynamic excitation device configured to have an excellent accuracy of excitation by using such an electrodynamic actuator.

According to an aspect of the invention, there is provided a linear actuator, comprising: a base; a fixed part support mechanism attached to the base; a fixed part elastically supported by the fixed part support mechanism; and a movable part driven to reciprocate in a predetermined drive direction with respect to the fixed part. The fixed part support mechanism comprises: a movable block attached to the fixed part; a linear guide that couples the movable block with the base to be slidable in the predetermined drive direction; and an elastic member that is disposed between the base and the movable block and prevents transmission of a high frequency component of vibration in the predetermined drive direction.

Since the fixed part is fixed to the base via the fixed part support mechanism, transmission of vibration in the axial direction to the fixed part can be prevented.

The elastic member may comprise an air spring.

The linear actuator may further comprise a fixing block fixed to the base. In this case, at least one of the linear guide and the elastic member may be attached to the base via the fixing block.

The movable block may be provided as a pair of movable blocks. In this case, the pair of movable blocks may be attached to both side surfaces of the fixed part to sandwich an axis of the fixed part therebetween.

At least a part of the movable part may be accommodated in a cylindrical hollow part of the fixed part, thereby forming the linear actuator as an electrodynamic actuator. The linear actuator may further comprise a plurality of movable part support mechanisms that support the movable part from a lateral side to enable the movable part to reciprocate in an axial direction of the fixed part. In this configuration, each of the plurality of movable part support mechanisms may comprise: a rail attached to a side surface of the movable part to extend in the predetermined drive direction; and a runner block attached to the fixed part to engage with the rail. The plurality of movable part support mechanisms may be arranged to have approximately constant intervals therebetween around an axis of the fixed part.

The plurality of movable part support mechanisms may be two pairs of movable part support mechanisms. In this case, the movable part may be disposed to be sandwiched between the two pairs of movable part support mechanisms in two directions which are perpendicular to each other.

The linear actuator may be horizontally disposed in a state where the axis of the fixed part is oriented in a horizontal direction. In this case, one of the plurality of movable part support mechanisms may be disposed under the axis of the fixed part.

The movable part may comprise a rod extending along the axis of the fixed part to protrude from one end of the movable part. In this case, the fixed part may comprise a bearing which supports the rod to be movable in the axial direction of the fixed part.

According to another aspect of the invention, there is provided an excitation device, comprising: at least one linear actuator described above; and a vibration table coupled to the movable part of the at least one linear actuator.

The at least one linear actuator may comprise two linear actuators. In this case, one of the two linear actuators may be a first actuator having a driving axis in a first direction, and the other of the two linear actuators may be a second actuator having a driving axis in a second direction perpendicular to the first direction. The excitation device may further comprise: a first slider that couples the vibration table with the first actuator to be slidable in the second direction; and a second slider that couples the vibration table with the second actuator to be slidable in the first direction.

The excitation device may further comprise: a third actuator having a driving axis in a third direction which is perpendicular to the first direction and the second direction; and a third slider that couples the vibration table with the third actuator to be slidable in the first direction and the second direction. In this configuration, the first slider may couple the vibration table with the first actuator to be slidable in the second direction and the third direction, and the second slider may couple the vibration table with the second actuator to be slidable in the first direction and the third direction.

DETAILED DESCRIPTION OF EMBODIMENTS

Hereafter, embodiments of the invention are described with reference to the accompanying drawings.

First Embodiment

Figure 1:
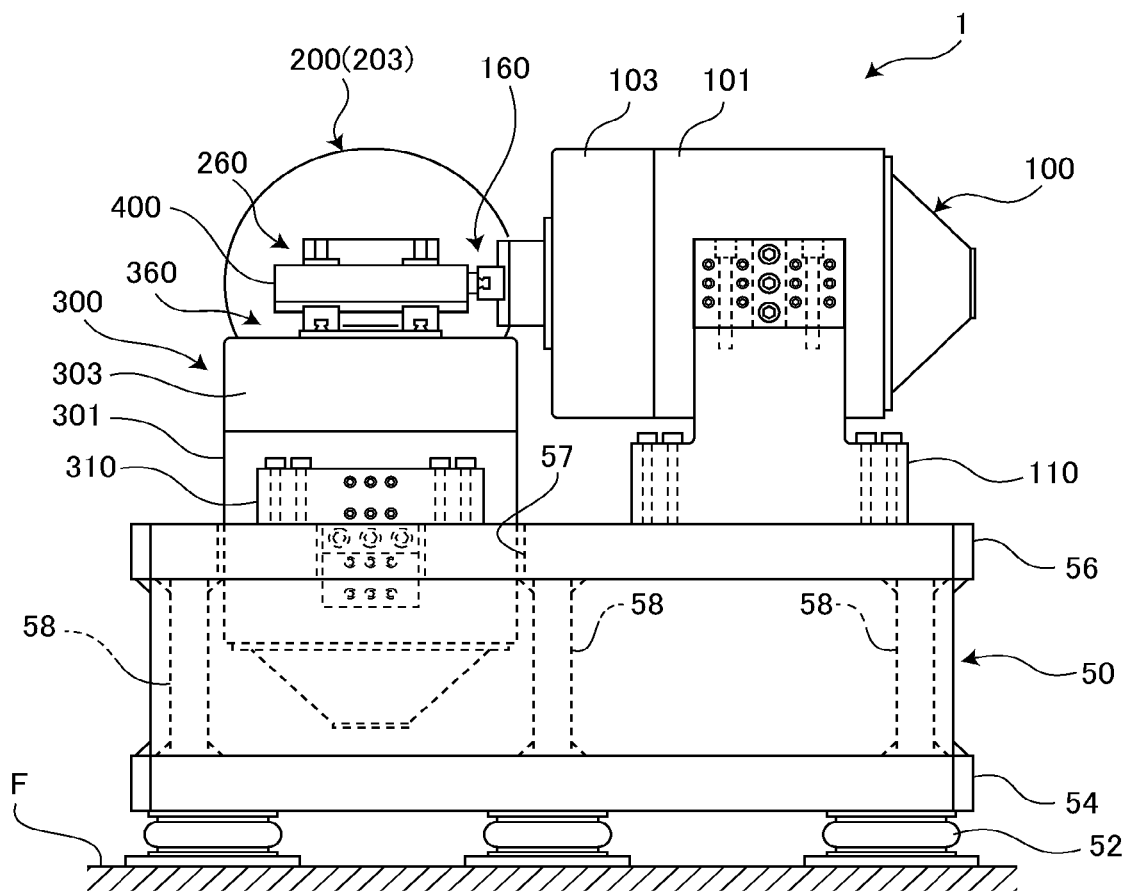
FIG. 1 is a front view of an electrodynamic excitation device according to a first embodiment of the invention.
Figure 2:
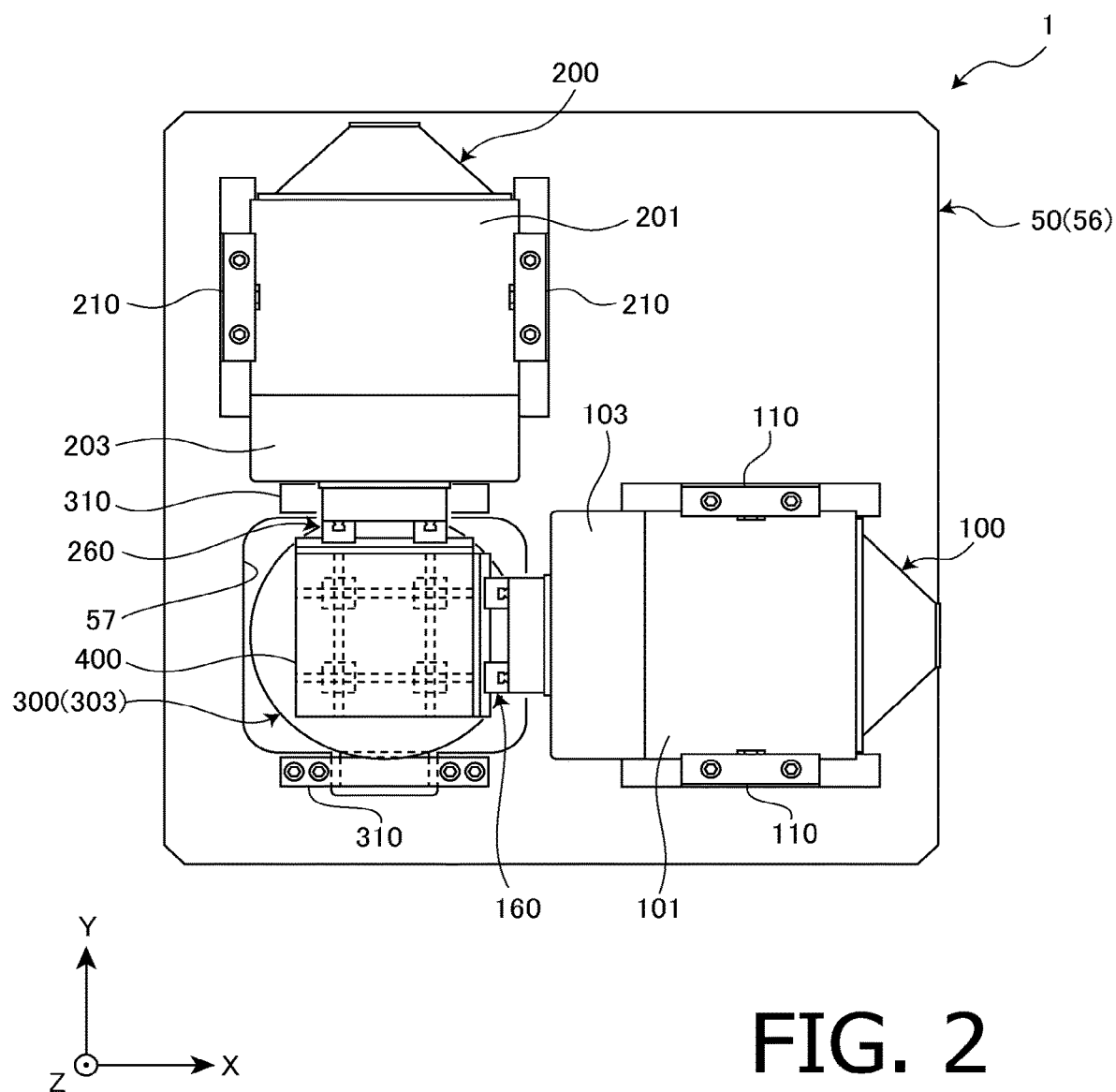
FIG. 2 is a plan view of the electrodynamic excitation device according to the first embodiment of the invention.
Figure 3:
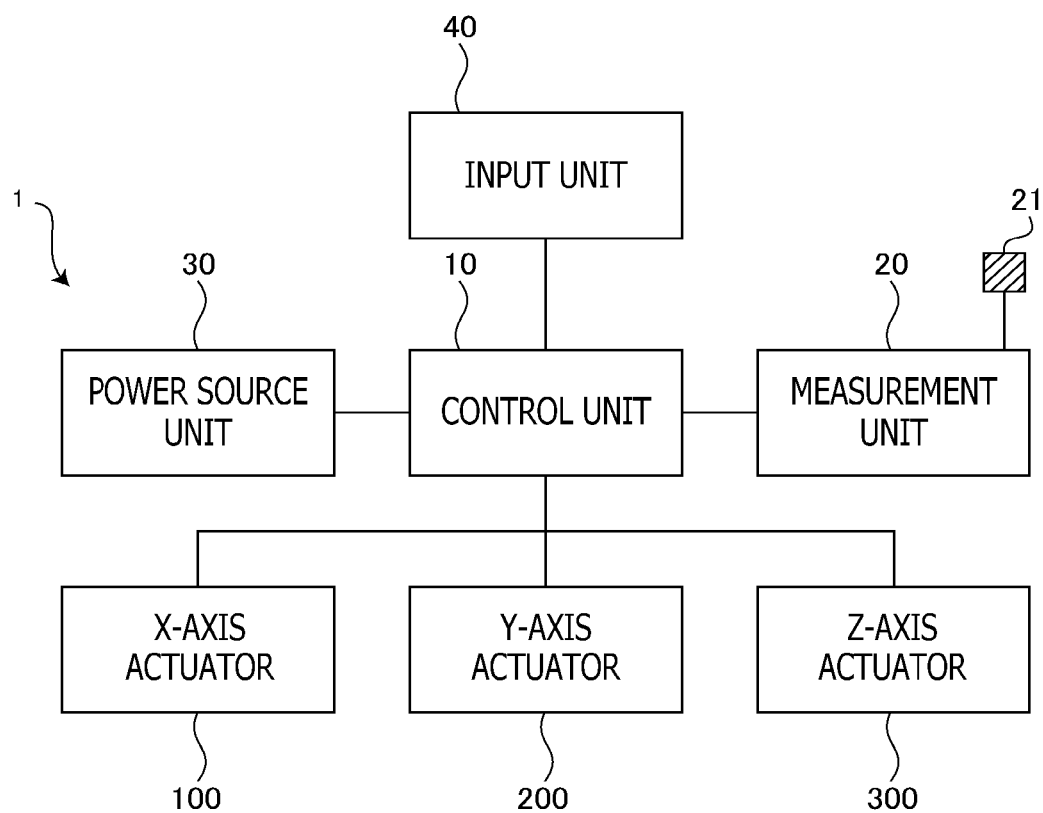
FIG. 3 is a block diagram of a drive system of the electrodynamic excitation device according to the first embodiment of the invention.

Hereafter, an electrodynamic triaxial excitation device 1 (hereafter, simply referred to as an excitation device 1) according to a first embodiment of the invention is described with reference to FIGS. 1 to 9. FIGS. 1 and 2 are a front view and a plan view of the excitation device 1, respectively. FIG. 3 is a block diagram illustrating a general configuration of a drive system of the excitation device 1. In the following explanation of the first embodiment, the left and right direction in FIG. 1 is defined as a X-axis direction (the rightward direction is a positive direction of X-axis), a direction perpendicular to the paper face of FIG. 1 is defined as a Y-axis direction (the direction from the front side to the back side of the paper face of FIG. 1 is a positive direction of Y-axis), and an up and down direction in FIG. 1 is defined as a Z-axis direction (the upward direction is a positive direction of Z-axis). The Z-axis direction is a vertical direction, and each of the X-axis direction and the Y-axis direction is a horizontal direction.

As shown in FIGS. 1 and 2, the excitation device 1 includes a vibration table 400 to which a test piece (not shown) is attached, three actuators (an X-axis actuator 100, a Y-axis actuator 200 and a Z-axis actuator 300) which vibrate the vibration table 400 in X-axis, Y-axis and Z-axis directions, respectively, and a device base 50 which supports the actuators 100, 200 and 300. The actuators 100, 200 and 300 are electrodynamic linear motion actuators each having a voice coil motor, and respectively include main bodies 101, 201 and 301, and covers 103, 203 and 303 covering movable parts (described later) protruding from the respective main bodies 101, 201 and 301. The vibration table 400 is coupled to the actuators 100, 200 and 300 via respective biaxial sliders (a YZ slider 160, a ZX slider 260 and a XY slider 360). The excitation device 1 is able to vibrate the test piece attached to the vibration table 400 in the three axes directions which are perpendicular to each other, by driving the vibration table 400 with the actuators 100, 200 and 300.

The device base 50 is formed such that horizontally arranged bottom and top plates and 56 are coupled to each other with a plurality of wall plates 58. The actuators 100, 200 and 300 are fixed to the top plate 56 of the device base 50 with a pair of fixing blocks 110, a pair of fixing blocks 210 and a pair of fixing blocks 310, respectively. An opening 57 is formed in the top plate 56, and the lower portion of the Z-axis actuator 300 is accommodated in the device base 50 via the opening 57. With this configuration, the excitation device 1 is formed to have a low height. In order to suppress transmission of the vibration from the device base 50 to an installation floor F, a plurality of antivibration mounts 52 are attached to the lower surface of the bottom plate 54.

As shown in FIG. 3, the drive system of the excitation device 1 includes a control unit 10 which totally controls operation of the excitation device 1, a measurement unit 20 which measures vibration of the vibration table 400, a power source unit 30 which supplies electric power to the control unit 10, and an input unit 40 which receives a data input from a user or an external device. The measurement unit 20 includes a triaxial vibration pickup 21 attached to the vibration table 400. The measurement unit 20 amplifies a signal (e.g., a speed signal) outputted by the triaxial vibration pickup 21 to convert the signal to a digital signal, and transmits the digital signal to the control unit 10. The triaxial vibration pickup 21 detects the vibrations in the X-axis, Y-axis and Z-axis directions of the vibration table 400 independently. Based on an excitation waveform inputted from the input unit 40 and the signal from the measurement unit 20, the control unit 10 is able to vibrate the vibration table 400 at desired amplitude and frequency by controlling the magnitude and the frequency of AC currents to be inputted to drive coils (described later) of the actuators 100, 200 and 300. Furthermore, based on the signal of the triaxial vibration pickup 21, the measurement unit 20 calculates various parameters (e.g., speed, acceleration, amplitude, power spectrum) indicating a vibrating state of the vibration table 40, and transmits the parameters to the control unit 10.

Next, configurations of the actuators 100, 200 and 300 are explained. Since each of the X-axis actuator 100 and the Y-axis actuator 200 has the same configuration as that of the Z-axis actuator 300, except that an air spring is not provided, the Z-axis actuator 300 is explained in detail as a representative example of the actuators.

Figure 4:
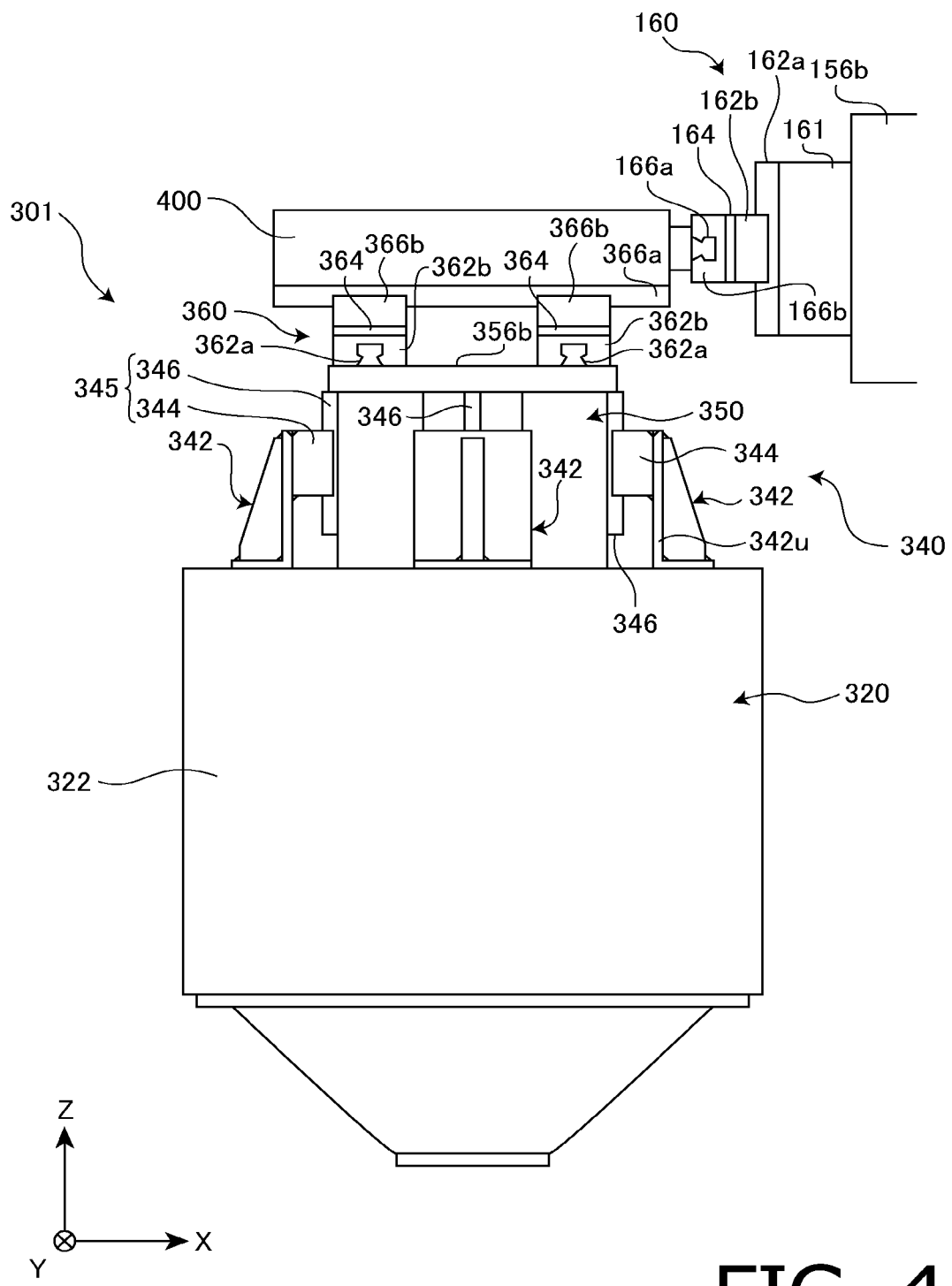
FIG. 4 is a front view of a main body of a Z-axis actuator according to the first embodiment of the invention.
Figure 5:
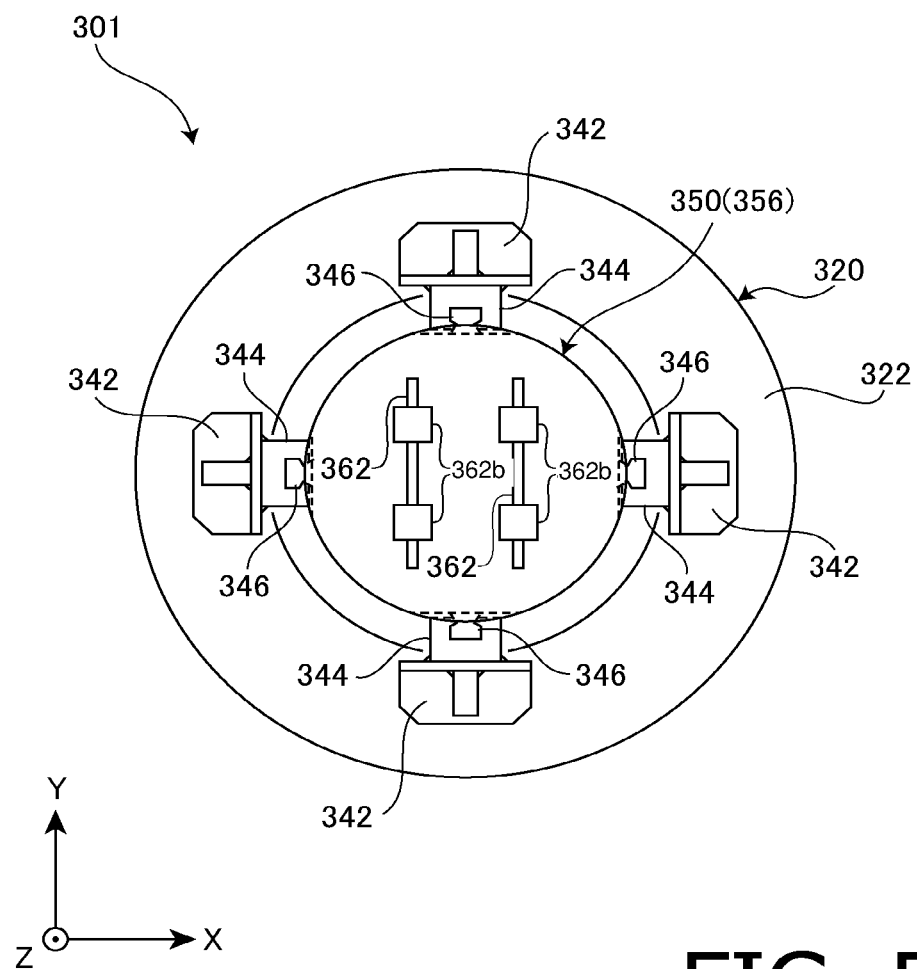
FIG. 5 is a plan view of the main body of the Z-axis actuator according to the first embodiment of the invention.
Figure 6:
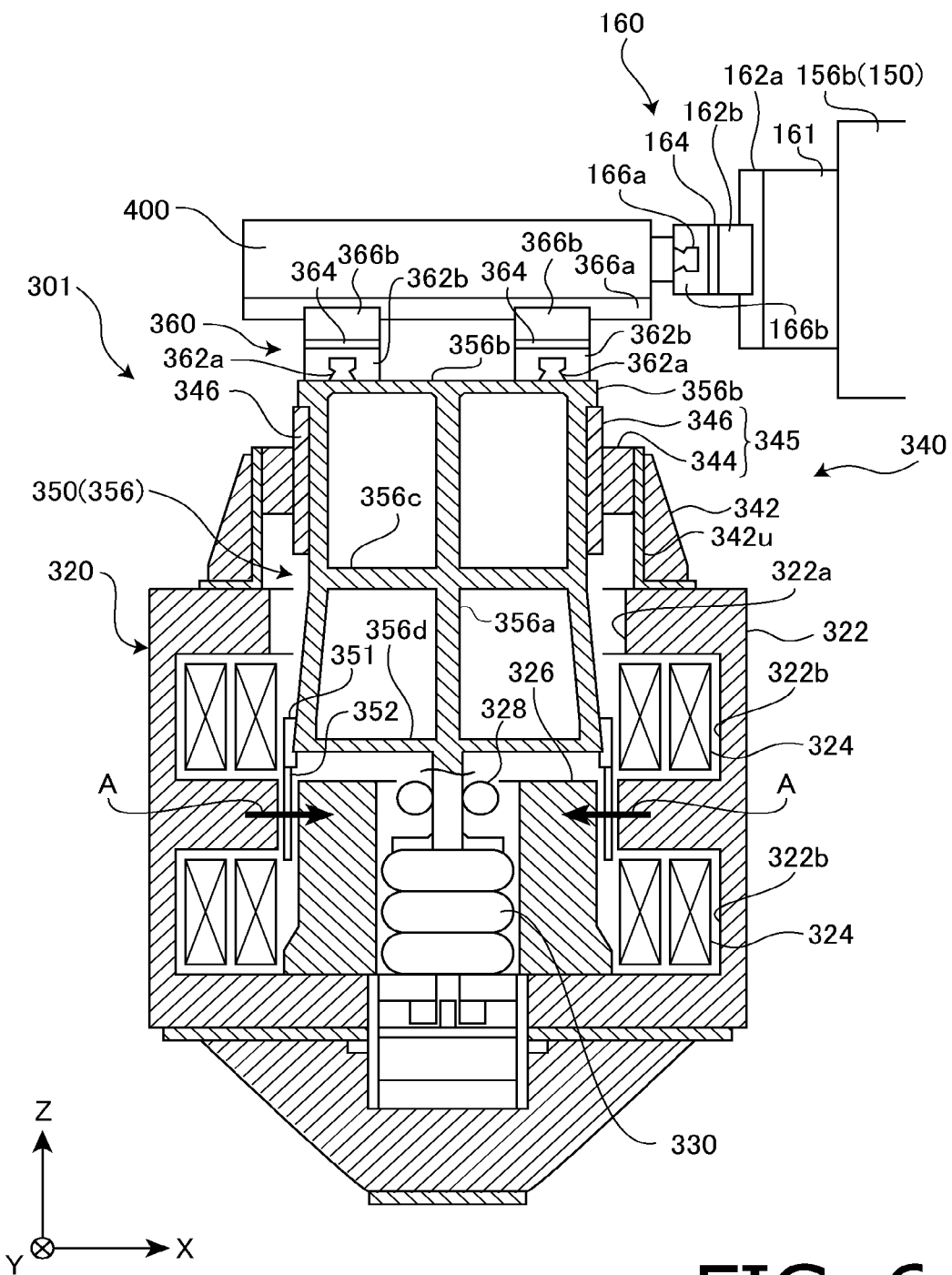
FIG. 6 is a vertical cross section of the main body of the Z-axis actuator according to the first embodiment of the invention.

FIGS. 4, 5 and 6 are a front view, a plan view and a vertical cross section of the main body 301 of the Z-axis actuator 300. The main body 301 includes a fixed part 320 having a cylindrical body 322, and a movable part 350 accommodated in a cylinder of the cylindrical body 322. The movable part 350 is provided to be movable in the Z-axis direction (the up and down direction in FIGS. 4 and 6) with respect to the fixed part 320. The movable part 350 includes a cylindrical movable frame 356, and a drive coil 352 disposed to be substantially coaxial with the movable frame 356. The drive coil 352 is attached to a lower end of the movable frame 356 via a drive coil holding member 351. The movable frame 356 is configured such that an upper portion thereof is formed in a shape of a cylinder and a lower portion thereof is formed in a shape of a frustum cone whose side face is gently inclined so that the outer diameter becomes larger toward the lower side. Furthermore, as shown in FIG. 6, the movable frame 356 includes a rod 356a extending along the center axis, a top plate 356b disposed to be perpendicular to the center axis, an intermediate plate 356c and a bottom plate 356d. The top plate 356b, the intermediate plate 356c and the bottom plate 356d are coupled to each other by the rod 356a. The rod 356a is formed to further extend downward from the bottom plate 356d. Furthermore, the vibration table 400 is attached to the top plate 356b via the XY slider 360.

In the cylindrical body 322 of the fixed part 320, a cylindrical inner magnet 326 is fixed to be coaxial with the cylindrical body 322. The inner magnet 326 has an outer diameter smaller than the inner diameter of the drive coil 352, and the drive coil 352 is disposed in a gap sandwiched between the outer circumferential surface of the inner magnet 326 and the inner circumferential surface of the cylindrical body 322. Each of the cylindrical body 322 and the inner magnet 326 is made of magnetic material. In the cylinder of the inner magnet 326, a bearing 328 which slidably supports the rod 356a in the Z-axis direction is fixed.

On the inner circumferential surface 322a of the cylindrical body 322, a plurality of recessed parts 322b are formed, and, in each recessed part 322b, an excitation coil 324 is accommodated. When a DC current (the excitation current) flows through the excitation coil 324, a magnetic field indicated by an arrow A is produced in the radial direction of the cylindrical body 322 in a portion where the inner circumferential surface 322a of the cylindrical body 322 is situated to closely face the outer circumferential surface of the inner magnet 326. When the current is supplied in this state, a Lorentz force is caused in the axial direction of the drive coil 352, i.e., in the Z-axis direction, and the movable part 350 is driven in the Z-axis direction.

In the cylinder of the inner magnet 326, an air spring 330 is accommodated. The lower end of the air spring 330 is fixed to the fixed part 320, and the rod 356a is fixed to the upper end of the air spring 330. The air spring 330 supports the movable frame 356 via the rod 356a from the lower side. That is, the weight (the static load) of the movable part 350, the XY slider 360 supported by the movable part 350, the vibration table 400 and the test piece is supported by the air spring 330. Therefore, by providing the air spring 330 for the Z-axis actuator 300, it becomes unnecessary to support the weight (the static load) of the movable part 350, the vibration table 400 and etc. by the driving force (Lorentz force) of the Z-axis actuator 300. Since it is only required to provide the dynamic load to vibrate the movable part 350, the driving current to be supplied to the Z-axis actuator 300 (i.e., power consumption) is reduced considerably. Furthermore, since the drive coil 352 can be downsized thanks to the reduction of the required driving force, it becomes possible to drive the Z-axis actuator 300 at a high frequency. Furthermore, it becomes unnecessary to supply a large DC component to the drive coil for supporting the weight of the movable part 350, the vibration table 400 and etc. Therefore, it becomes possible to employ a simple and compact circuit as the power source unit 30.

When the movable part 350 of the Z-axis actuator 300 is driven, the fixed part 320 also receives a reaction force (the excitation force) in the drive axis (Z-axis) direction. By providing the air spring 330 between the movable part 350 and the fixed part 320, the exciting force transmitted from the movable part 350 to the fixed part 320 is reduced. As a result, for example, the vibration of the movable part 350 is prevented from being transmitted, as noise, to the vibration table 400 via the fixed part 320, the device base 50 and the actuators 100 and 200.

Next, a configuration of a movable part support mechanism 340 which supports the upper portion of the movable part 350 to be slidable in the axis direction is explained. The movable part support mechanism 340 includes guide frames 342, Z-axis runner blocks 344 and Z-axis rails 346. To a side surface of a cylindrical upper portion of the movable part 350 (the movable frame 356), four Z-axis rails 346 extending in the Z-axis direction are attached. On the upper surface of the fixed part 320 (the cylindrical body 322), four guide frames 342 are fixed to have constant intervals (of 90°) along the outer circumferential surface of the cylindrical body 322. The guide frame 342 is a fixing member having a cross section formed in a shape of a letter L enforced by a rib. To an upright part 342u of each guide frame 342, the Z-axis runner block 344 engaging with the Z-rail 346 is attached. The Z-axis runner block 344 has a plurality of rotatable balls 344b (described later), and constitutes a Z-axis linear guide 345 of a ball bearing type, together with the Z-axis rail 346. That is, the movable part 350 is supported, from the lateral side, by the four pairs of supporting mechanisms each of which is formed of the guide frame 342 and the Z-axis linear guide 345, so that the movable part 350 is not able to move in the X-axis and Y-axis directions. As a result, occurrence of crosstalk by the vibration of the movable part 350 in the X-axis and Y-axis directions can be prevented. Furthermore, through use of the Z-axis linear guide 345, the movable part 350 is able to smoothly move in the Z-axis direction. Furthermore, since the movable part 350 is supported to be movable only in the Z-axis direction by the bearing 328 also in the lower portion as described above, the movable part 350 is not able to move in the X-axis and Y-axis directions. As a result, the vibration of the movable part 350 in the X-axis and Y-axis directions becomes hard to occur.

In the case where the movable frame 356 and the guide frame 342 are coupled to each other with the Z-axis linear guide 345, it is also possible to employ a configuration where the Z-axis rail 346 is attached to the guide frame 342 fixed to the fixed part 320 and the Z-axis runner block 344 is attached to the movable frame 356. However, in this embodiment, the Z-axis rail 346 is attached to the movable frame 356 and the Z-axis runner block 344 is attached to the guide frame 342, in contrast to the above described configuration. By employing such a configuration in this embodiment, unnecessary vibration can be suppressed. This is because the Z-axis rail 346 is lighter than the Z-axis runner block 344, the Z-axis rail 346 is longer than the Z-axis runner block 344 in the drive direction (Z-axis direction) (therefore, mass per a unit of length is small), the mass distribution in the drive direction is uniform, and therefore the fluctuation of the mass distribution caused when the Z-axis actuator 300 is driven is smaller in the case where the Z-axis rail 346 is attached to the movable side and as a result the vibration caused in accordance with the fluctuation of the mass distribution can be suppressed to a low level. Furthermore, since the barycenter of the Z-axis rail 346 is lower (i.e., the distance from the installation surface to the barycenter is shorter) than the barycenter of the Z-axis runner block 344, the moment of inertia becomes smaller in the case where the Z-axis rail 346 is fixed to the movable side. Accordingly, with this configuration, it becomes possible to set the resonance frequency to be higher than the excitation frequency (e.g., 0 to 100 Hz), and thereby it becomes possible to prevent deterioration of the accuracy of excitation by resonance.

Figure 7:
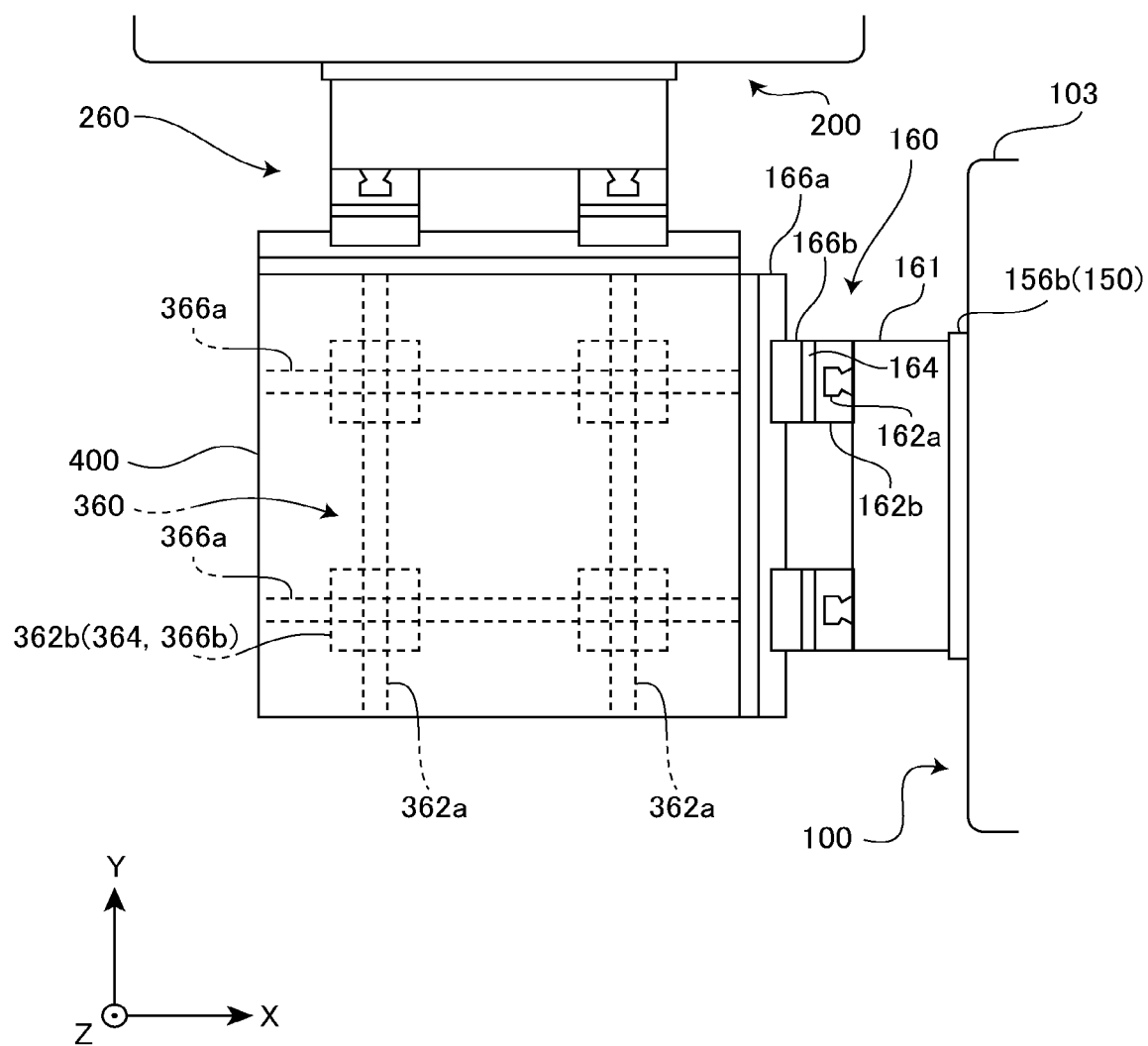
FIG. 7 is an enlarged plan view illustrating a portion around a vibration table of the Z-axis actuator according to the first embodiment of the invention.

Hereafter, a configuration of the XY slider 360 which couples the Z-axis actuator 300 to the vibration table 400 is explained. FIG. 7 is a plan view enlarging a portion around the vibration table 400. As shown in FIGS. 6 and 7, the XY slider 360 includes two Y-axis rails 362*a*, four Y-axis runner blocks 362*b*, four joint plates 364, four X-axis runner blocks 366*b* and two X-axis rails 366*b*. The two Y-axis rails 362*a* extending in the Y-axis direction are attached to the upper surface of the top plate 356*b*. To the Y-axis rails 362*a*, the two Y-axis runner blocks 362 engaging with the Y-axis rail 362 are attached to be slidable along the Y-axis rails 362*a*. The two X-axis rails 366*a* extending in the X-axis direction are attached to the lower surface of the vibration table 400. To the X-axis rails 366*a*, the two X-axis runner blocks 366*b* engaging with the X-rail 366*a* are attached to be slidable along the X-axis rails 366*a*. The X-axis runner blocks 366*b* are coupled to respective ones of the Y-axis runner blocks 362*b* via the respective joint plates 364. Specifically, one of the X-axis runner blocks 366*b* engaging with one X-axis rail 366*a* is coupled to one of the Y-axis runner blocks 362*b* engaging with one Y-axis rails 362*a*, and the other X-axis runner block 366*b* is coupled to one of the Y-axis runner blocks 362*b* engaging with the other Y-axis rail 362*a*. That is, each X-axis rail 366*a* is coupled to the Y-axis rail 362*a* via the X-axis runner block 366*b* and the Y-axis runner block 362*b* coupled with the joint plate 364. With this configuration, the vibration table 400 is coupled to the movable part 350 of the Z-axis actuator 300 to be slidable in the X-axis and Y-axis directions.

As described above, by coupling the Z-axis actuator 300 to the vibration table 400 via the XY slider 360 to be slidable in the X-axis and Y-axis directions by a very small force, the vibration components of the vibration table 40 in the X-axis and Y-axis directions are not transmitted to the Z-axis actuator 300 even when the vibration table 400 is vibrated in the X-axis and Y-axis directions by the X-axis actuator 100 and the Y-axis actuator 200. Furthermore, even when the vibration table 400 is vibrated in the Z-axis direction by the Z-axis actuator 300, the vibration component of the vibration table 400 in the Z-axis direction is not transmitted to the X-axis actuator 100 and the Y-axis actuator 200. Accordingly, excitation in a low degree of crosstalk can be realized.

Hereafter, a configuration of the YZ slider 160 which couples the X-axis actuator 100 to the vibration table 400 is explained. The YZ slider 160 includes two Z-axis rails 162*a*, two Z-axis runner blocks 162*b*, two joint plates 164, two Y-axis runner blocks 166*b* and one Y-axis rail 166*a*. The two Z-axis rail 162*a* extending in the Z-axis direction are attached to a top plate 156*b* of the movable frame of the X-axis actuator 100. To the Z-axis rail 162*a*, the Z-axis runner block 162*b* engaging with the Z-axis rail 162*a* is attached to be slidable along the Z-axis rail 162*a*. Furthermore, to a side surface of the vibration table 400 facing the X-axis actuator 100, the Y-axis rail 166*a* extending in the Y-axis direction is attached. The Y-axis runner block 166*b* is coupled to one of the Z-axis runner blocks 162*b* via one of the Z-axis runner blocks 162*b*. That is, the Y-axis rail 166*a* is coupled to the Z-axis rail 162*a* via the Y-axis runner block 166*b* and the Z-axis runner block 162*b* coupled by the joint plate 164. With this configuration, the vibration table 400 is coupled to the movable part 150 of the X-axis actuator 100 to be slidable in the Y-axis and Z-axis directions.

As described above, by coupling the X-axis actuator 100 to the vibration table 400 via the YZ slider 160 to be slidable in the Y-axis and Z-axis directions at a small degree of frictional force, the vibration components of the vibration table 400 in the Y-axis and Z-axis directions are not transmitted to the X-axis actuator 100 even when the vibration table 400 is vibrated by the Y-axis actuator 200 and the Z-axis actuator in the Y-axis and Z-axis directions. Furthermore, even when the vibration table 400 is vibrated in the X-axis direction by the X-axis actuator 100, the vibration component of the vibration table 400 in the X-axis direction is not transmitted to the Y-axis actuator 200 and the Z-axis actuator 300. As a result, excitation in a low degree of crosstalk can be realized.

The ZX slider 260 which couples the Y-axis actuator 200 to the vibration table 400 also has the same configuration as that of the YZ slider 160, and the vibration table 400 is coupled to the movable part of the Y-axis actuator 200 to be slidable in the Z-axis and X-axis directions. Therefore, even when the vibration table 400 is vibrated by the Z-axis actuator 300 and the X-axis actuator 100 in the Z-axis and X-axis directions, the vibration components of the vibration table 400 in the Z-axis and X-axis directions are not transmitted to the Y-axis actuator 200. Furthermore, even when the vibration table 400 is vibrated in the Y-axis direction by the Y-axis actuator 200, the vibration component of the vibration table 400 in the Y-axis direction is not transmitted to the Z-axis actuator 300 and the X-axis actuator 100. As a result, excitation in a low degree of crosstalk can be realized.

As described above, the actuators 100, 200 and 300 are able to accurately excite the vibration table 400 in the drive axis directions without interfering with each other. Furthermore, since each of the actuators 100, 200 and 300 is supported by the guide frame and the linear guide such that the movable part thereof is slidable only in the drive direction, vibration in the non-drive direction is hard to occur. Therefore, vibration in the non-drive direction which is not being controlled is not applied to the vibration table 400. As a result, the vibration of the vibration table 400 in each drive axis direction can be accurately controlled by driving of the corresponding one of the actuators 100, 200 and 300.

Next, a configuration of a liner guide mechanism (a rail and a runner block) used in each of the movable part support mechanism 340, the YZ slider 160, the ZX slider 260 and the XY slider 360 is explained, taking the Z-axis linear guide mechanism 345 (the Z-axis runner block 344 and the Z-axis rail 346) used in the movable part support mechanism 340 as an example. The other rails and the runner blocks are also configured to have the same configurations as those of the Z-axis runner block 344 and the Z-axis rail 346, respectively.

Figure 8:
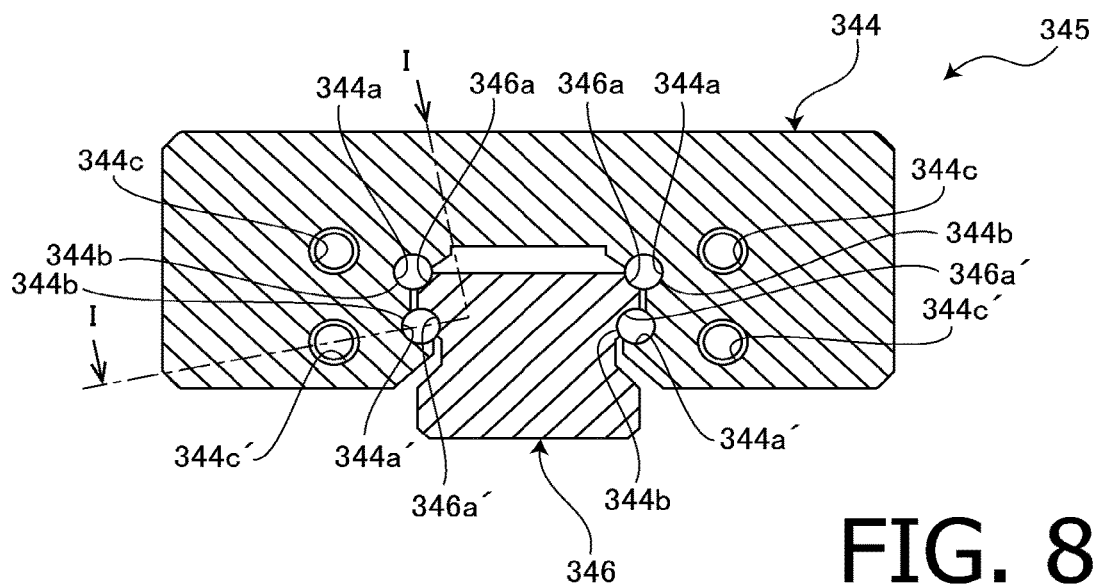
FIG. 8 is a cross section of a linear guide used in the electrodynamic excitation device according to the first embodiment of the invention.
Figure 9:
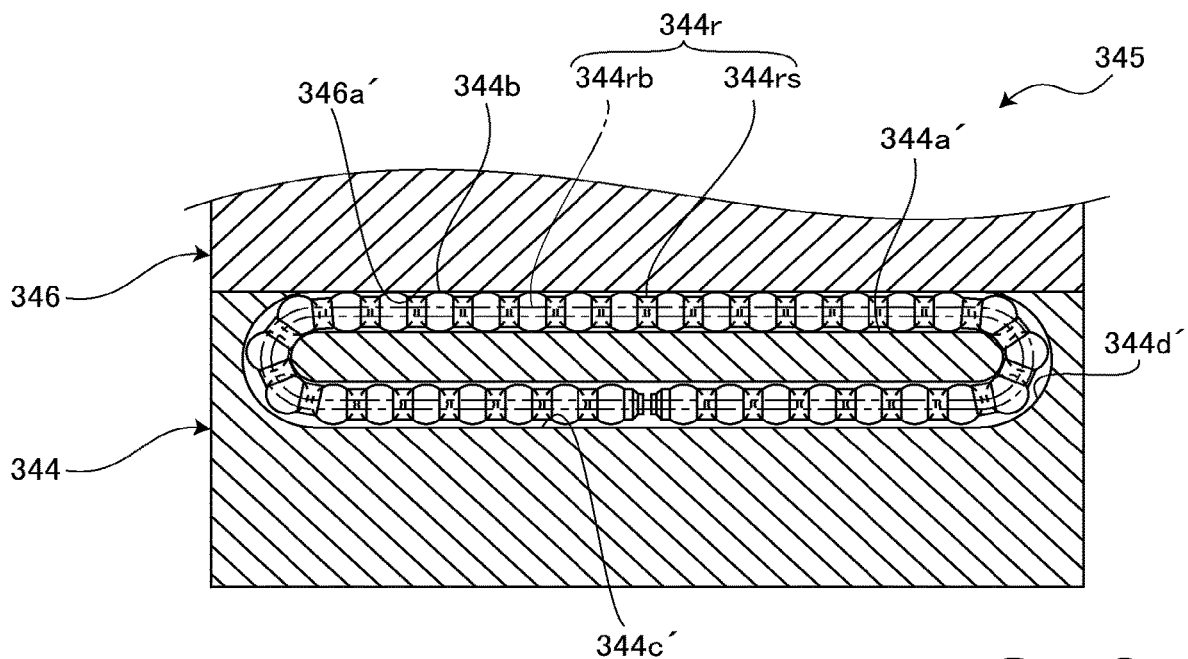
FIG. 9 is a cross section taken by a line I-I in FIG. 8.

FIG. 8 is a cross-sectional view of the Z-axis rail 346 and the Z-axis runner block 344 of the movable part support mechanism 340, viewed by cutting along a plane (i.e., an XY plane) perpendicular to the longer axis of the Z-axis rail 346. FIG. 9 is an I-I cross section of the FIG. 8. As shown in FIGS. 8 and 9, a recessed part is formed on the Z-axis runner block 344 to surround the Z-axis rail 346, and two pairs of grooves 344*a* and 344'*a* are formed on the recessed part to extend in the axial direction of the Z-axis rail 346. In each of the grooves 344*a* and 344*a'*, a plurality of stainless steel balls 344*b* and a resin retainer 344*r* are accommodated. The retainer 344r has a plurality of spacers 344rs disposed between the balls 344b, and a pair of bands 344rb coupling the plurality of spaces 344rs. The balls 344b are held in spaces surrounded by the plurality of spacers 344rs and the band 344rb. Grooves 346a and 346a' are formed on the Z-axis rail 346 at positions facing the grooves 344a and the 344a' of the Z-axis runner block 344, respectively, and the balls 344b and the retainer 344r are sandwiched between the groove 344a and the groove 346a or between the groove 344a' and the groove 346a'. Each of the grooves 344a, 344a', 346a and 346a' has a cross section formed in a shape of an arc, and the curvature radius of the arc is the same as the radius of the ball 344b. Therefore, the ball 344b closely contacts each of the grooves 344a, 344a', 346a and 346a' with almost no play.

In the Z-axis runner block 344, two pairs of ball saving paths 344c and 344c' are provided to extend in substantially parallel with the grooves 344a and 344a'. As shown in FIG. 9, the groove 344a' and the saving path 344c' are connected by U-shaped paths 344d' at both ends, and a circular path for circulating the balls 344b and the retainer 344r is formed by the groove 344a', the groove 346a', the saving path 344c' and the U-shaped paths 344d'. Similarly, a circular path is also formed by the groove 344a, the groove 346a and the saving path 344c.

Therefore, when the Z-axis runner block 344 moves with respect to the Z-axis rail 346, the plurality of balls 344b circulate, together with the retainer 344r, while rotating along the grooves 344a and 346a and the grooves 344a' and 346a'. Therefore, even when a large load is applied in a direction other than the axial direction of the rail, the Z-axis runner block 344 can be smoothly moved along the Z-axis rail 346 because the Z-axis runner block 344 can be supported by the plurality of balls 344b and resistance in the axial direction of the rail can be kept at a low level due to rotations of the balls 344b. An inner diameter of each of the saving paths 344c and 344c' and the U-shaped paths 344d and 344d' is slightly larger than the diameter of the ball 344b. For this reason, the frictional force caused between the ball 344b and each of the saving paths 344c and 344c' and the U-shaped paths 344d and 344d' is very small, and the circulating motion of the balls 344b are not hampered by the frictional force.

By providing the spacers 344rs of the retainer 344r having a low degree of rigidity between the balls 344b, wearing and loss of oil film which would be caused by direct contact of the balls at one point can be avoided, the frictional resistance is lowered, and as a result the lifetime can be increased considerably.

Each of the X-axis actuator 100 and the Y-axis actuator 200 also has a movable part support mechanism (not shown). The movable part of the X-axis actuator 100 is supported by a guide frame from the both sides in the two directions (Y-axis and Z-axis directions) which are perpendicular to the drive direction (X-axis). Similarly, the movable part of the Y-axis actuator 200 is supported by a guide frame from the both sides in the two directions (Z-axis and X-axis directions) which are perpendicular to the drive direction (Y-axis). Each of the X-axis actuator 100 and the Y-axis actuator 200 is placed such that the longer side direction of the movable part is oriented horizontally. Therefore, in a conventional actuator not provided with a movable part support mechanism, a movable part is supported only by a rod in a state of a cantilever type, and therefore a tip side (the vibration table 400 side) of the movable part falls downward due to its own weight and this causes factors of friction and undesired vibration during the driving. By contrast, in this embodiment, the movable part of each of the X-axis actuator 100 and the Y-axis actuator 200 is supported from the lower side by the guide frame, such a problem is solved.

Second Embodiment

Hereafter, an electrodynamic biaxial excitation device 1000 (hereafter, simply referred to as an "excitation device 1000") according to a second embodiment of the invention is explained with reference to FIGS. 10 to 12. In the excitation device 1 according to the above described first embodiment, the main bodies 101, 201 and 301 (specifically, the fixed part) of the actuators are firmly supported by the device base 50 via the fixing blocks 110, 210 and 310, respectively. Therefore, vibration of the fixed part of one actuator may be transmitted to the vibration table 400 via the device base 50 and the other of the actuators 100, 200 and 300, and may becomes a noise component of the vibration. As described later, the excitation device 1000 according to the second embodiment is configured such that a fixed part of each actuator is supported by a device base via an air spring in the drive direction in which strong vibration is caused. Therefore, according to the second embodiment, excitation with a still higher degree of accuracy can be realized.

Figure 10:
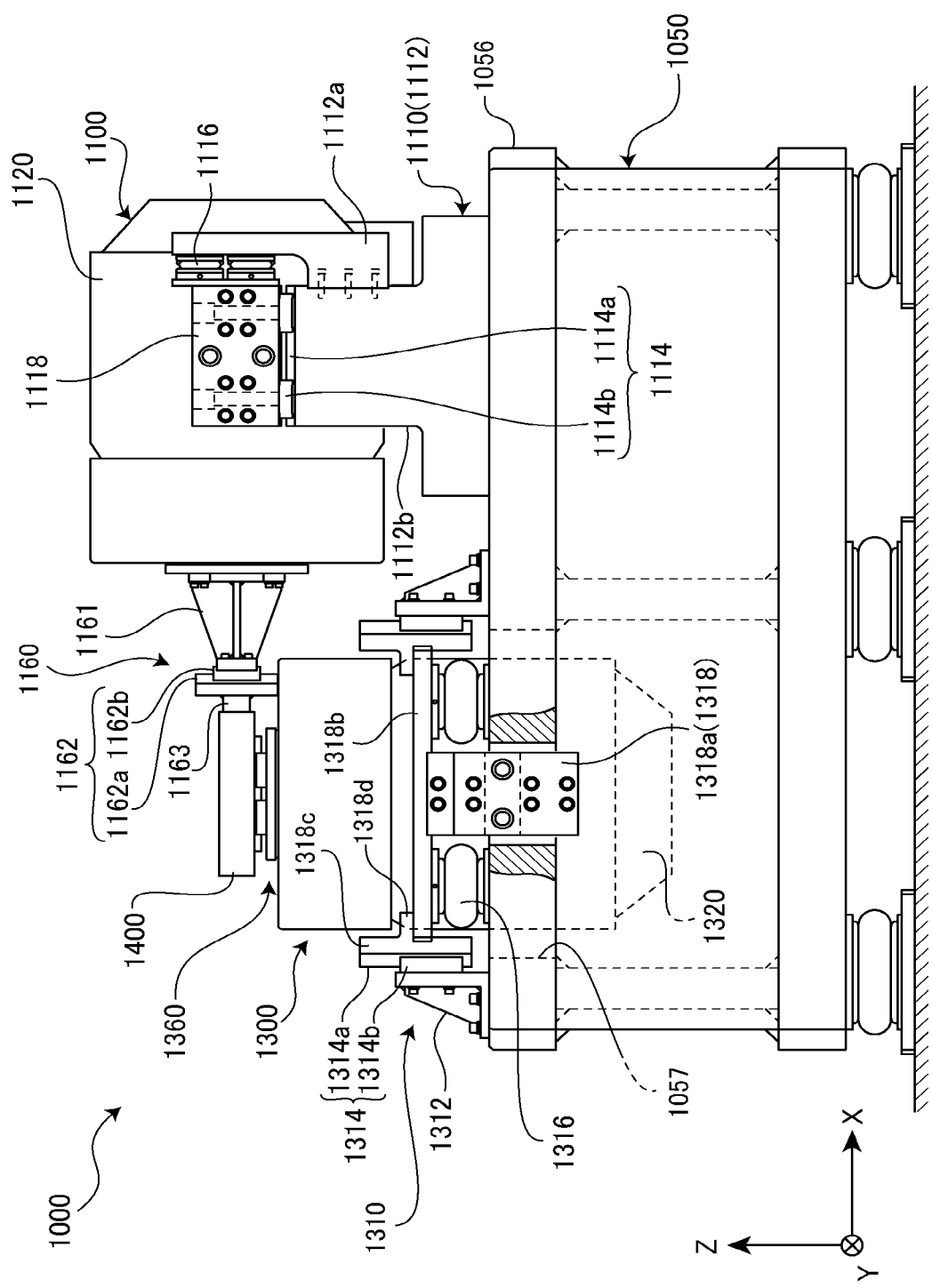
FIG. 10 is a front view of an electrodynamic excitation device according to a second embodiment of the invention.
Figure 11:
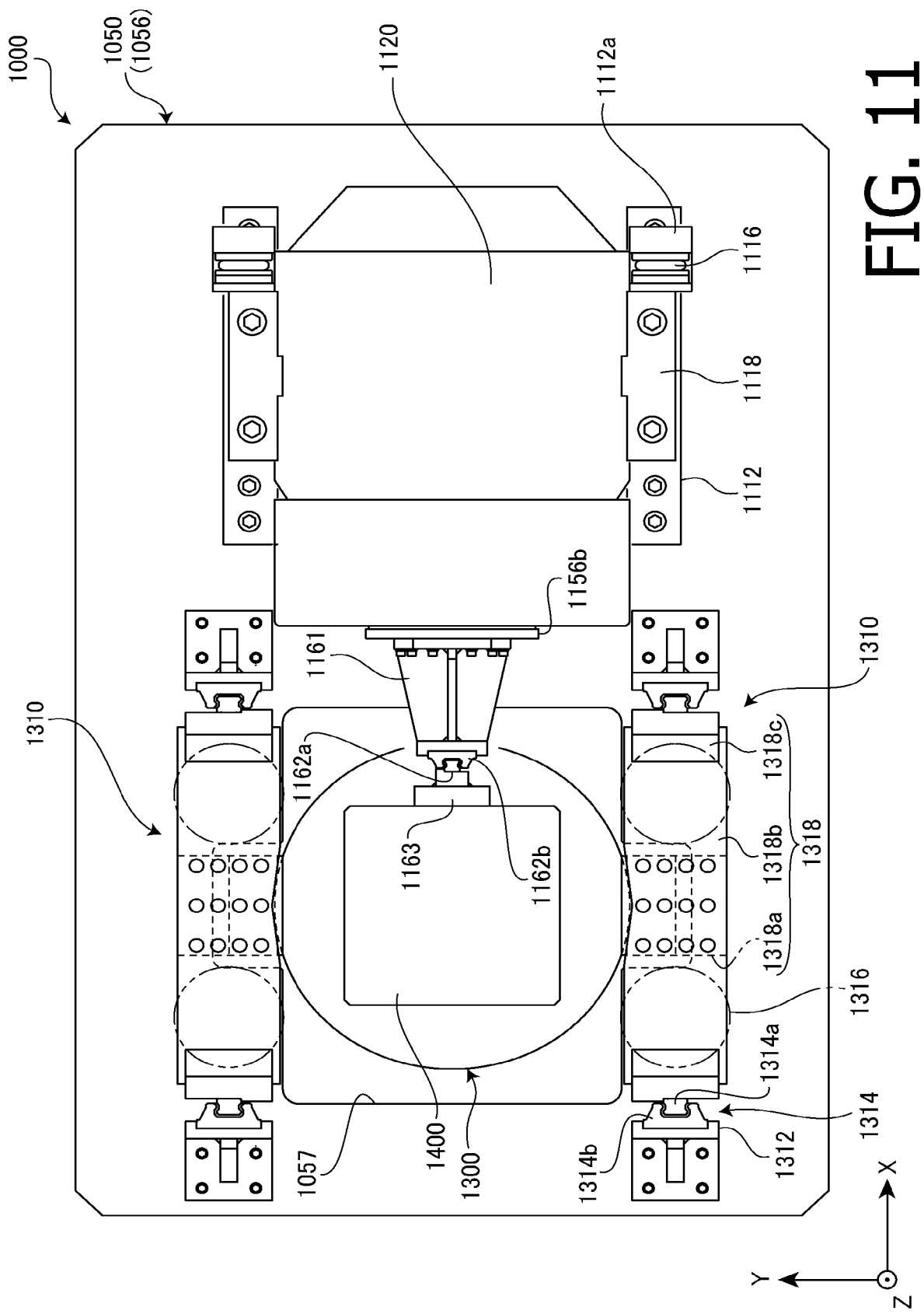
FIG. 11 is a plan view of the electrodynamic excitation device according to the second embodiment of the invention.
Figure 12:
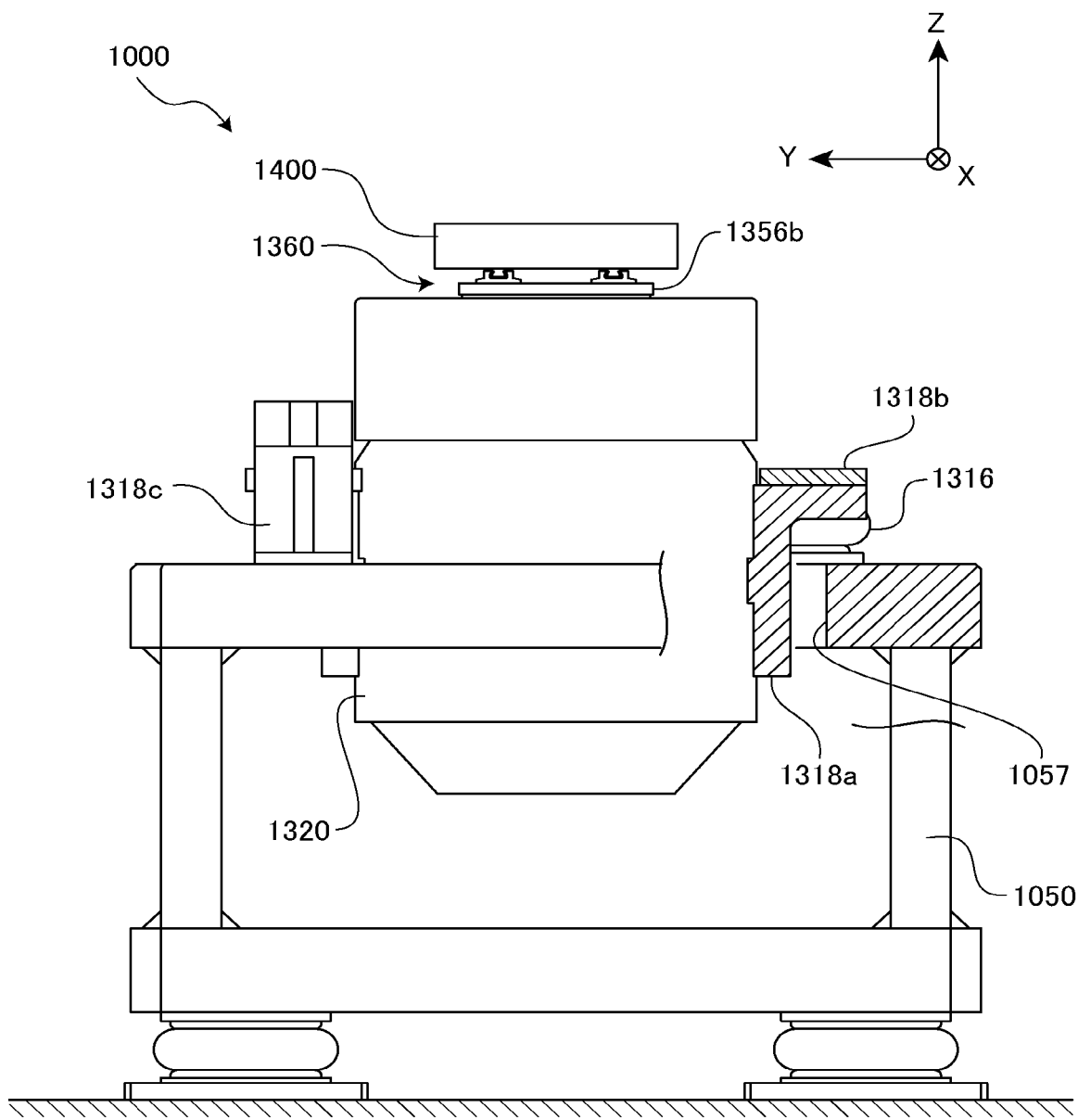
FIG. 12 is a side view of the electrodynamic excitation device according to the second embodiment of the invention.

FIGS. 10, 11 and 12 are a front view, a plan view and a side view (showing a left side in FIG. 10) of the excitation device 1000, respectively. In the following explanation about the second embodiment, the rightward direction in FIG. 10 is defined as a positive direction of the X-axis, the direction pointing from the front side to the back side of the paper face of FIG. 10 is defined as the positive direction of the Y-axis, and the upward direction in FIG. 10 is defined as the positive direction of the Z-axis. The Z-axis direction is a vertical direction, and each of the X-axis and Y-axis directions is a horizontal direction. To elements which are the same or substantially the same as those of the first embodiment, the similar reference numbers are assigned, and detailed explanations thereof are omitted.

The excitation device 1000 is configured to be able to vibrate a test piece (not shown) in the two directions, i.e., the X-axis direction and the Z-axis direction, and includes a vibration table 1400 to which the test piece is attached, two actuators (an X-axis actuator 1100 and a Z-axis actuator 1300) which vibrate the vibration table 1400 in the X-axis and Z-axis directions, respectively, a device base 1050 which supports the actuators 1100 and 1300. One side surface of the vibration table 1400 is coupled to the X-axis actuator 1100 via a Z-axis slider 1160, and the lower surface of the vibration table 1400 is coupled to the Z-axis actuator 1300 via an X-axis slider 1360. As in the case of the excitation device 1 of the first embodiment, the excitation device 1000 also includes a biaxial vibration pickup, a measurement unit, a control unit, an input unit and a power source unit (not shown). The inner configuration of the actuators 1100 and 1300 and the configuration of the device base 1050 are the same as those of the excitation device 1 of the first embodiment.

The X-axis actuator 1100 is fixed to a top plate 1056 of the device base 1050 by a support unit 1110. The support unit 1110 includes a pair of fixing blocks 1112 each having an inverted T-shape attached to the top plate 1056, a pair of movable blocks 1118 each having a rectangular plate shape respectively attached to the both side faces of a fixed part 1120 of the X-axis actuator 1100, and a pair of linear guides 1114 which slidably couple the fixing block 1112 and the movable block 1118 in the X-axis direction. Each linear guide 1114 includes a rail 1114a which is attached to the upper surface of a foot part 1112b of the inverted T-shape fixed block 1112 to extend in the X-axis direction, and a pair of runner blocks 1114b which is attached to the lower surface of the movable block 1118 to engage with the rail 1114a. On a side surface of the foot part 1112b of the fixed block 1112 on the positive side of the X-axis, a branch part 1112a extending upward is fixed. The side surface of the movable block 1118 on the positive side of the X-axis is coupled to the branch part 1112a of the fixed block 1112 via a pair of air springs 1116 arranged in the up and down direction. Thus, the fixed part 1120 of the X-axis actuator 1100 is flexibly supported, by the fixed part support mechanism including the linear guide 1114 and the air springs 1116, in the drive direction (X-axis direction), with respect to the fixed block 1112 (i.e., the device base 1050). Therefore, the strong reaction force (the excitation force) applied to the fixed part 1120 in the X-axis direction during driving of the X-axis actuator 1100 is not directly transmitted to the device base 1050, and is transmitted to the device base 1050 after the high frequency component thereof is largely reduced by the air springs 1116. Therefore, the vibration noise transmitted to the vibration table 1400 is reduced considerably.

The Z-axis actuator 1300 is fixed to the top plate 1056 of the device base 1050 by a pair of support units 1310 arranged on the both sides thereof in the Y-axis direction. The lower portion of the Z-axis actuator 1300 is accommodated in the device base 1050 through an opening 1057 provided in the top plate 1056 of the device base 1050. Each support unit 1310 includes a movable block 1318, a pair of angles 1312 and a pair of linear guides 1314. The movable block 1318 is a support member attached to the side surface of a fixed part 1320 of the Z-axis actuator 1300. The pair of angles 1312 is disposed to face the both sides of the movable block 1318 in the X-axis direction, and is attached to the upper surface of the top plate 1056. The both sides of the movable block 1318 in the X-axis direction are coupled to the respective angles 1312 to be slidable in the Z-axis direction by the pair of linear guides 1314. The movable block 1318 includes an angle block 1318a, a flat plate block 1318b and a pair of T-shaped blocks 1318c. One attachment surface of the L-shaped angle block 1318a is fixed to the side surface of the fixed part 1320 of the Z-axis actuator 1300. On the other attached surface of the angle block 1318a oriented upward, the flat plate block 1318b having a rectangular flat shape extending in the X-axis direction is fixed at the central portion in the longer side direction of the flat plate block 1318b. To the upper surfaces at the both ends in the X-axis direction of the flat plate block 1318b, foot parts 1318d of the T-shaped blocks 1318c are attached. To the attachment surfaces of the T-shaped blocks 1318c (the both side surfaces in the X-axis direction of the movable block 1318), the rails 1314a of the linear guides 1314 extending in the Z-axis direction are attached, respectively. The runner block 1314b which faces and engages with the rail 1314a is attached to each angle 1312. At the both ends in the X-axis direction of the angle block 1318a, a pair of air springs 1316 is disposed to be sandwiched between the flat plate block 1318b and the top plate 1056 of the device base 1050, and the movable block 1318 is supported by the top plate 1056 via the pair of air springs 1316. Thus, as in the case of the X-axis actuator 1100, the Z-axis actuator 1300 is also flexibly supported, in the drive direction (Z-axis direction), with respect to the device base 1050 via the fixed part support mechanism including the liner guide 1314 and the air springs 1316. Therefore, the strong reaction force (the excitation force) applied to the fixed part 1320 during driving of the Z-axis actuator 1300 is not directly transmitted to the device base 1050, and the high frequency component thereof is largely reduced by the air springs 1316. As a result, the vibration noise transmitted to the vibration table 1400 is reduced largely.

The forgoing is the explanations about the embodiments of the invention. It is understood that embodiments of the present invention are not limited to the above described embodiments, and can be varied within the scope of the invention.

For example, the excitation device 1 of the first embodiment is an example in which the invention is applied to an actuator of an electrodynamic triaxial excitation device, and the excitation device 1000 of the second embodiment is an example in which the invention is applied to an actuator of an electrodynamic biaxial excitation device; however, the invention may also be applied to an electrodynamic single-axis excitation device.

In the above described first embodiment, the movable part 350 of the electrodynamic actuator 300 is supported, from the lateral side, by the four movable part support mechanism 340 disposed to have approximately constant intervals around the axis of the cylindrical body 322. However, the invention is not limited to such a configuration. In another embodiment, the movable part may be supported, from the lateral side, by two or more (preferably more than three) movable part support mechanisms arranged to have approximately constant intervals around the axis of the cylindrical body.

In the above described first embodiment, the runner block is fixed to the upper surface of the cylindrical body 322 via the fixed guide frame 342; however, the runner block may be directly fixed to the inner circumferential surface of the cylindrical body 322.

In the above described second embodiment, the air springs 1116 and 1316 are used as buffering members for reducing the vibration of the fixed part support mechanism; however, various members, such as another type of spring or an elastic body (a rubber cushion) having the vibration absorption function, or a damper device using an electromagnetic reaction force, may be used.

The linear actuator according to the embodiment of the invention may be used for a device other than the excitation device. For example, the actuator according to the embodiment may be used for a universal test device (material test device) for performing a tension and compression test, an accurate positioning device or a jack device.

In the above described embodiment, the actuator is controlled using the speed of the vibration table as a control variable; however, control may be performed by using the displacement or the acceleration of the vibration table as a control variable. In place of the vibration table, the displacement, the speed or the acceleration of the test piece or the movable part of the actuator may be used as a control variable to drive and control the actuator.

What is claimed is:

1. A linear actuator, comprising:
   a base
   a fixed part;
   a fixed part support mechanism attached to the base; and
   a movable part driven to reciprocate in a predetermined drive direction with respect to the fixed part,
   wherein the fixed part is elastically supported by the fixed part support mechanism,
   wherein the fixed part support mechanism comprises:

a movable block fixed to the fixed part;
a linear guide that couples the movable block with the base to be slidable in the predetermined drive direction; and
an elastic member that is coupled to the movable block in the predetermined drive direction,
wherein the linear guide includes:
a first rail attached to the movable block; and
a first runner block attached to the base, the first runner block being slidably engaged with the first rail in the drive direction,
wherein the movable block is slidable with the fixed part with respect to the base in the predetermined direction, and
wherein the elastic member reduces vibration transmitted to the base from the fixed part
wherein a first side in the predetermined drive direction of the movable part has a substantially cylindrical shape and protrudes outside a cylindrical hollow part of the fixed part, and a second side in the predetermined drive direction of the movable part is accommodated in the cylindrical hollow part of the fixed part, thereby forming the linear actuator as an electrodynamic actuator,
the linear actuator further comprising a plurality of movable part support mechanisms that support the movable part from a lateral side to enable the movable part to reciprocate in the predetermined drive direction,
wherein each of the plurality of movable part support mechanisms comprises:
a second rail attached to a side surface of the first side of the movable part to extend in the predetermined drive direction; and
a second runner block attached to the fixed part to engage with the second rail.

2. The linear actuator according to claim 1, wherein a full length of the second rail is supported by the side surface of the substantially cylindrical part of the movable part.

3. The linear actuator according to claim 1, wherein the plurality of movable part support mechanisms are arranged to have approximately constant intervals therebetween around an axis of the fixed part.

4. The linear actuator according to claim 1, wherein:
the plurality of movable part support mechanisms are two pairs of movable part support mechanisms; and
the movable part is disposed to be sandwiched between the two pairs of movable part support mechanisms in two directions which are perpendicular to each other.

5. The linear actuator according to claim 1, wherein:
the linear actuator is horizontally disposed in a state where the axis of the fixed part is oriented in a horizontal direction; and
one of the plurality of movable part support mechanisms is disposed under the axis of the fixed part.

6. The linear actuator according to claim 1, wherein:
the movable part comprises a rod extending along the axis of the fixed part to protrude from one end of the movable part; and
the fixed part comprises a bearing which supports the rod to be movable in the axial direction of the fixed part.

7. The linear actuator according to claim 1, further comprising a fixing block fixed to the base, wherein
at least one of the linear guide and the elastic member is attached to the base via the fixing block.

8. The linear actuator according to claim 1, wherein the movable block is provided as a pair of movable blocks; and the pair of movable blocks is attached to both side surfaces of the fixed part to sandwich an axis of the fixed part therebetween.

9. The linear actuator according to claim 1, wherein the predetermined drive direction is perpendicular to an upper surface of the base; and
the elastic member couples the fixed part to the base in the predetermined drive direction.

10. The linear actuator according to claim 1, wherein the predetermined drive direction is parallel to an upper surface of the base;
the support mechanism comprises a fixing block fixed to the base; and
the elastic member couples the fixed part to the fixing block in the predetermined drive direction.

11. The linear actuator according to claim 1, wherein the movable part comprises:
a substantially cylindrical movable frame; and
a drive coil attached to the second side of the movable frame, wherein:
the second side of the movable frame is accommodated in the cylindrical hollow part of the fixed part, and
the first side of the movable frame protrudes outside the cylindrical hollow part of the fixed part, and
the second rail is attached to a side surface of the first side of the movable frame.

12. The linear actuator according to claim 11, wherein the fixed part has two excitation coils arranged along the predetermined drive direction, and
the drive coil is disposed between the two excitation coils in the predetermined drive direction.

13. The linear actuator according to claim 12, wherein the fixed part has:
a cylindrical body made of magnetic material; and
an inner magnet made of magnetic material and disposed coaxially in the cylindrical hollow part, wherein
two recessed parts are formed on an inner circumferential surface of the cylindrical hollow part, the two excitation coils being accommodated in respective recessed parts, and
the drive coil is disposed in a gap between a portion of the inner circumferential surface between the two recessed parts and an outer circumferential surface of the inner magnet.

14. An excitation device, comprising:
at least one linear actuator according to claim 1; and
a vibration table coupled to the movable part of the at least one linear actuator.

15. The excitation device according to claim 14, wherein;
the at least one linear actuator comprises two linear actuators;
one of the two linear actuators is a first actuator having a driving axis in a first direction; and
the other of the two linear actuators is a second actuator having a driving axis in a second direction perpendicular to the first direction,
wherein the excitation device further comprises:
a first slider that couples the vibration table with the first actuator to be slidable in the second direction; and
a second slider that couples the vibration table with the second actuator to be slidable in the first direction.

16. The excitation device according to claim 15, further comprising:

a third actuator having a driving axis in a third direction which is perpendicular to the first direction and the second direction; and
a third slider that couples the vibration table with the third actuator to be slidable in the first direction and the second direction,
wherein:
the first slider couples the vibration table with the first actuator to be slidable in the second direction and the third direction; and
the second slider couples the vibration table with the second actuator to be slidable in the first direction and the third direction.

* * * * *

UNITED STATES PATENT AND TRADEMARK OFFICE
CERTIFICATE OF CORRECTION

| | |
|---|---|
| PATENT NO. | : 11,289,991 B2 |
| APPLICATION NO. | : 16/516590 |
| DATED | : March 29, 2022 |
| INVENTOR(S) | : Sigeru Matsumoto |

It is certified that error appears in the above-identified patent and that said Letters Patent is hereby corrected as shown below:

On the Title Page

Item [56], delete:
"GN 101414778 B 12/2010"

And insert:
--CN 101414778 B 12/2010--

Signed and Sealed this
Fourteenth Day of June, 2022

Katherine Kelly Vidal
*Director of the United States Patent and Trademark Office*